United States Patent [19]

Springer

[11] 4,194,109
[45] Mar. 18, 1980

[54] FOOD SERVING TRAY AND SUPPORTING HEATER SHELF

[75] Inventor: Donald A. Springer, San Jose, Calif.

[73] Assignee: Messer Griesheim GmbH, Frankfurt am Main, Fed. Rep. of Germany

[21] Appl. No.: 839,379

[22] Filed: Oct. 4, 1977

Related U.S. Application Data

[62] Division of Ser. No. 758,455, Jan. 11, 1977.

[51] Int. Cl.² .............................................. H05B 1/00
[52] U.S. Cl. ................................. 219/386; 99/347; 211/134; 219/521; 312/236
[58] Field of Search ............................. 219/385–387, 219/521, 218, 400; 220/346, 347; 312/236, 209; 211/126, 133, 134; 108/143, 102; 248/241; 99/377, 416, 443 R, 448

[56] References Cited

U.S. PATENT DOCUMENTS

| 1,715,459 | 6/1929 | Kress | 211/134 |
|---|---|---|---|
| 2,551,651 | 5/1951 | Vandewater | 219/385 |
| 2,563,253 | 8/1951 | Levin | 312/236 |
| 2,661,993 | 12/1953 | Little | 211/134 |
| 3,552,379 | 1/1971 | Clarke | 219/387 |
| 3,677,172 | 7/1972 | Wilson | 99/448 |
| 3,805,018 | 4/1974 | Luong et al. | 219/387 |
| 3,908,749 | 9/1975 | Williams | 219/386 |
| 3,924,100 | 12/1975 | Mack et al. | 219/386 |
| 4,019,022 | 4/1977 | Seider et al. | 219/386 |
| 4,020,310 | 4/1977 | Souder, Jr. et al. | 312/236 |
| 4,041,277 | 8/1977 | Shumrak et al. | 219/386 |

FOREIGN PATENT DOCUMENTS

735719 11/1932 France ....................................... 219/218

Primary Examiner—Bruce A. Reynolds
Assistant Examiner—Bernard Roskoski
Attorney, Agent, or Firm—Connolly and Hutz

[57] ABSTRACT

A food serving tray and heater shelf arrangement includes a rack having sets of cantilevered supports with a heater element mounted to each pair of supports and with a food serving tray on each heater element straddling its supports.

21 Claims, 13 Drawing Figures

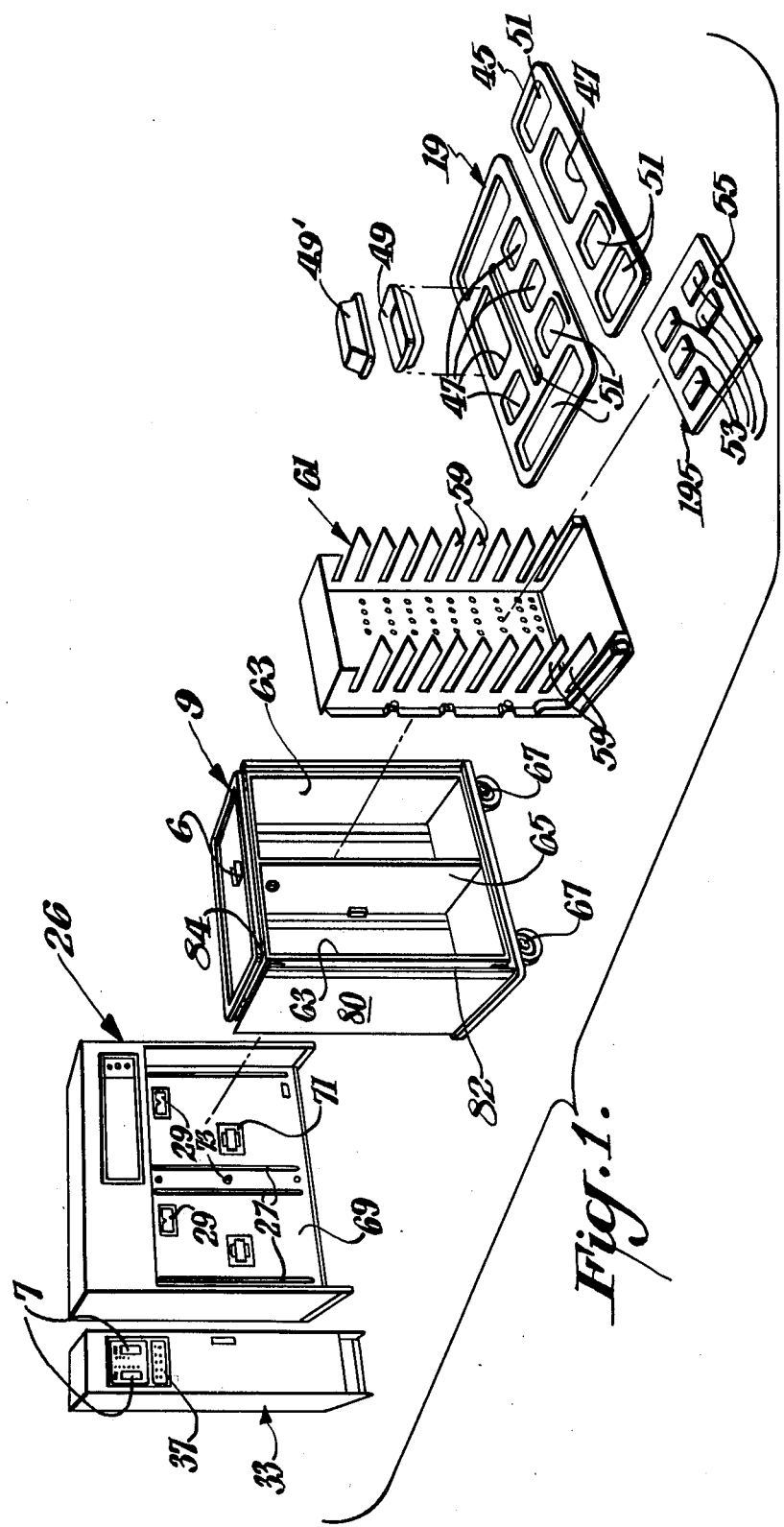

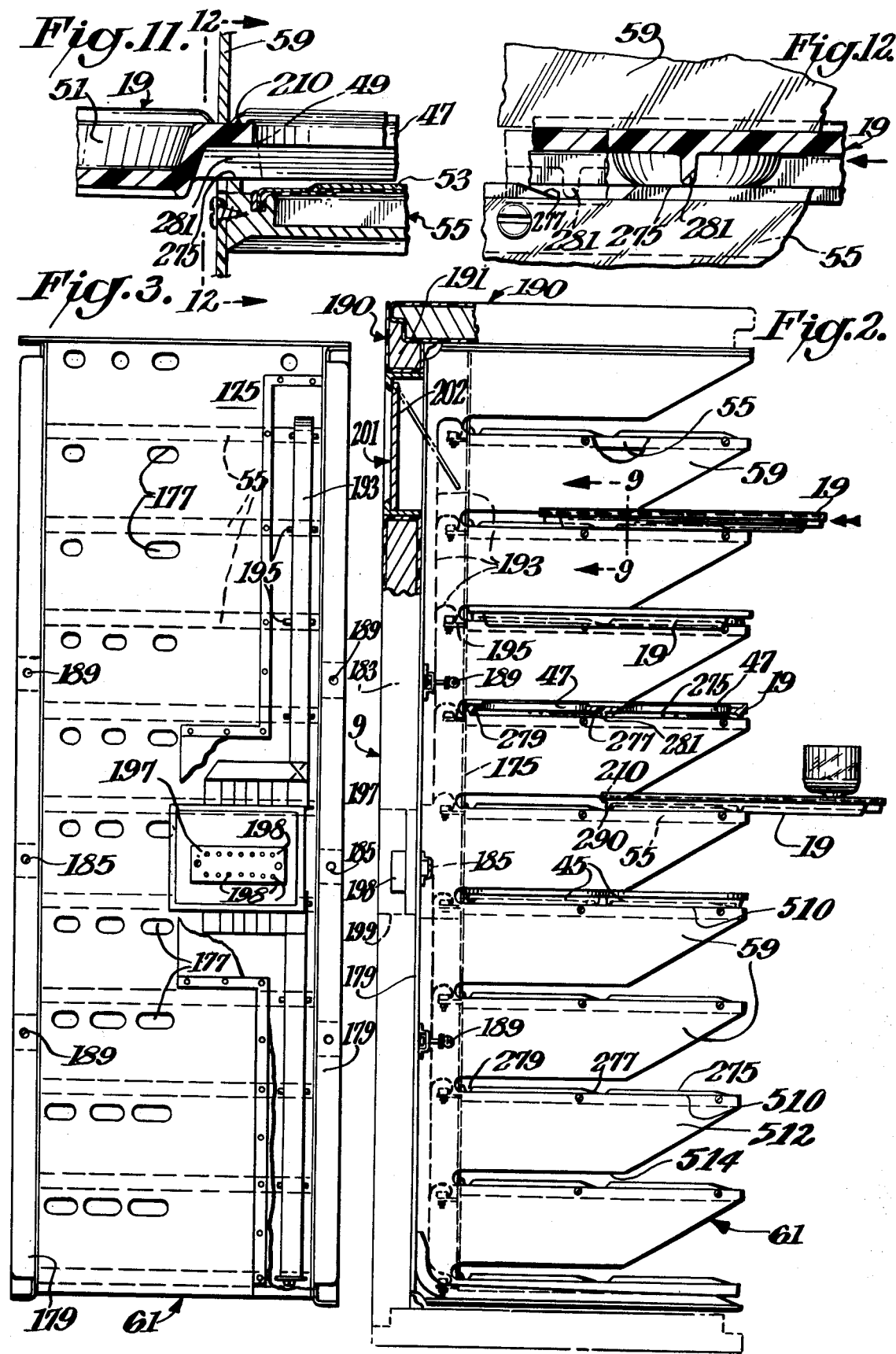

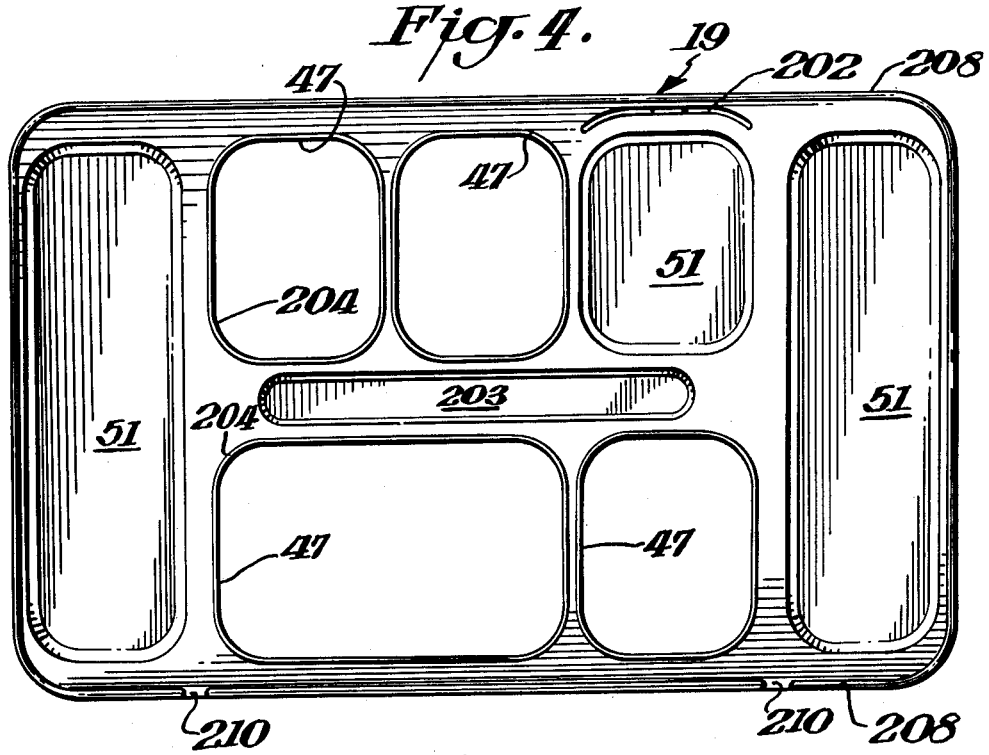
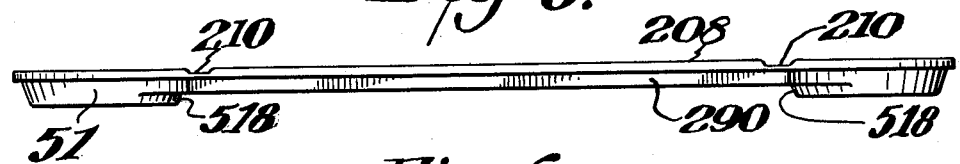
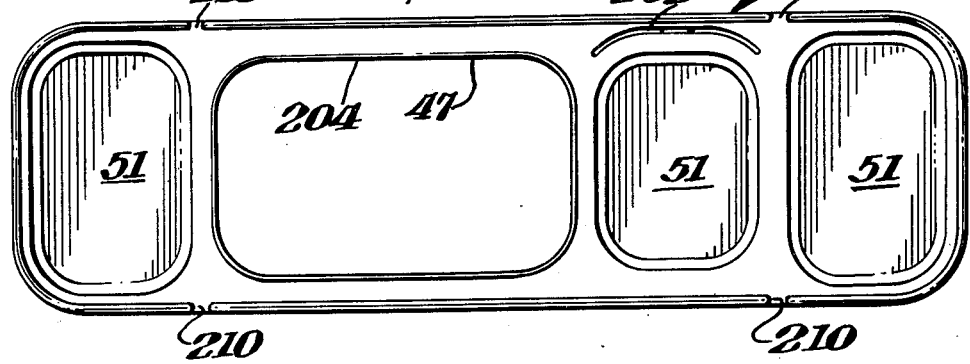

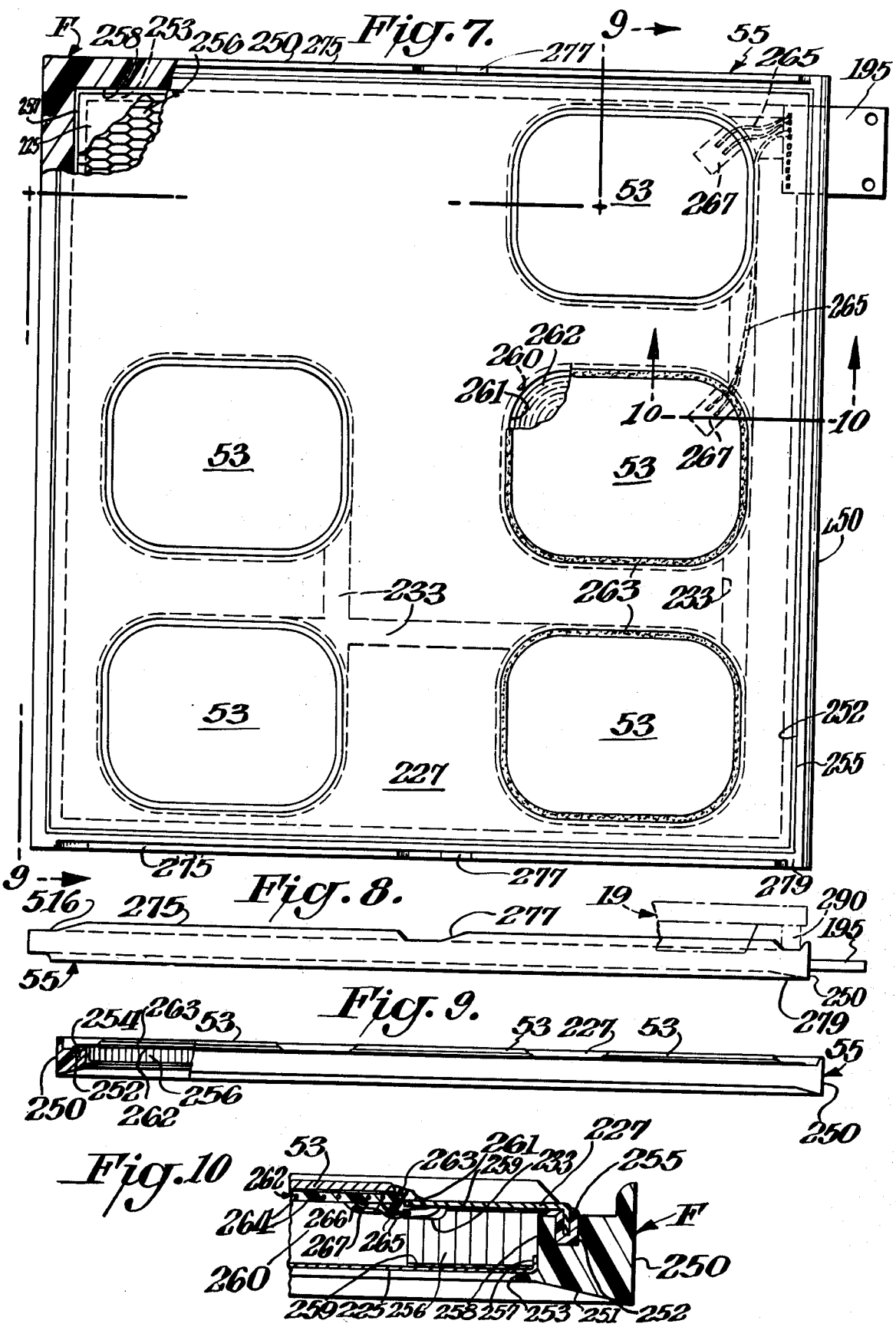

FOOD SERVING TRAY AND SUPPORTING HEATER SHELF

CROSS-REFERENCE TO RELATED APPLICATIONS

This application is a division of parent application Ser. No. 758,455, filed Jan. 11, 1977 pending.

Application Ser. No. 839,389, filed Oct. 4, 1977 is a further division of the parent application. Additionally applications Ser. No. 758,454, filed Jan. 11, 1977; Ser. No. 866,631, filed Jan. 3, 1978; and Ser. No. 775,768, filed Mar. 9, 1977, now U.S. Pat. No. 4,087,142 have the same disclosure as the parent application.

BACKGROUND OF THE INVENTION

There has existed for a long time a need for an efficient, easy to operate food preparation apparatus and process which prepares nutritional and appetizing meals for hospital patients and other institutional patients, airline passengers, as well as for groups of people such as field or factory workers who are isolated from restaurants or food dispensing outlets.

The above-identified applications describe a sophisticated system and its advantages over prior systems. The present invention is directed to a rack, heater shelves and trays particularly adapted to be usable in that system.

SUMMARY OF INVENTION

In accordance with one aspect of this invention, the rack includes sets of pairs of closely spaced cantilevered supports. Each tray includes notches in its leading edge spaced apart a distance corresponding to the distance between the supports so that a tray can slide on a shelf and the cantilevered supports thereabove would be disposed over the notches.

In another aspect of the invention, each heater shelf mounted to a pair of supports includes raised side borders with a detent in each border at the remote end thereof and with a second detent about midway in each border. The tray includes a rib on its lower surface for selectively fitting in a set of the remote or of the midway detents.

In yet another aspect of the invention each heater shelf has its side border tapered upwardly from its front edge and the tray has rounded surfaces extending below the general plane of the tray with the rounded surfaces being part of food receiving depressions which are outside of the cantilevered supports when the tray is on its heater shelf straddling the supports.

DESCRIPTION OF DRAWINGS

FIG. 1 is an exploded view of the main components of a system in which this invention is usable;

FIG. 2 is a side elevation of the heater shelf rack illustrating serving trays in various positions;

FIG. 3 is a rear elevation of the heater shelf rack shown in FIG. 2 illustrating the electrical connector, for the heater shelves, and the air circulation vents;

FIG. 4 is a top view of the general diet serving tray;

FIG. 5 is a front elevation of the FIG. 4 tray;

FIG. 6 is a top view of a modified diet serving tray which can also be used with the present invention;

FIG. 7 is a top view of a heater shelf with portions broken away;

FIG. 8 is a side elevation of the heater shelf of FIG. 7

FIG. 9 is a section taken along line 9—9 of FIG. 7

FIG. 10 is a section taken along line 10—10 of FIG. 14.

FIG. 11 is a fragmental section taken along line 11—11 of FIG. 2 illustrating a serving tray sliding into position along the heater shelf rack;

FIG. 12 is a fragmental section taken along line 12—12 of FIG. 11; and

DESCRIPTION OF THE INVENTION

Figure 13:
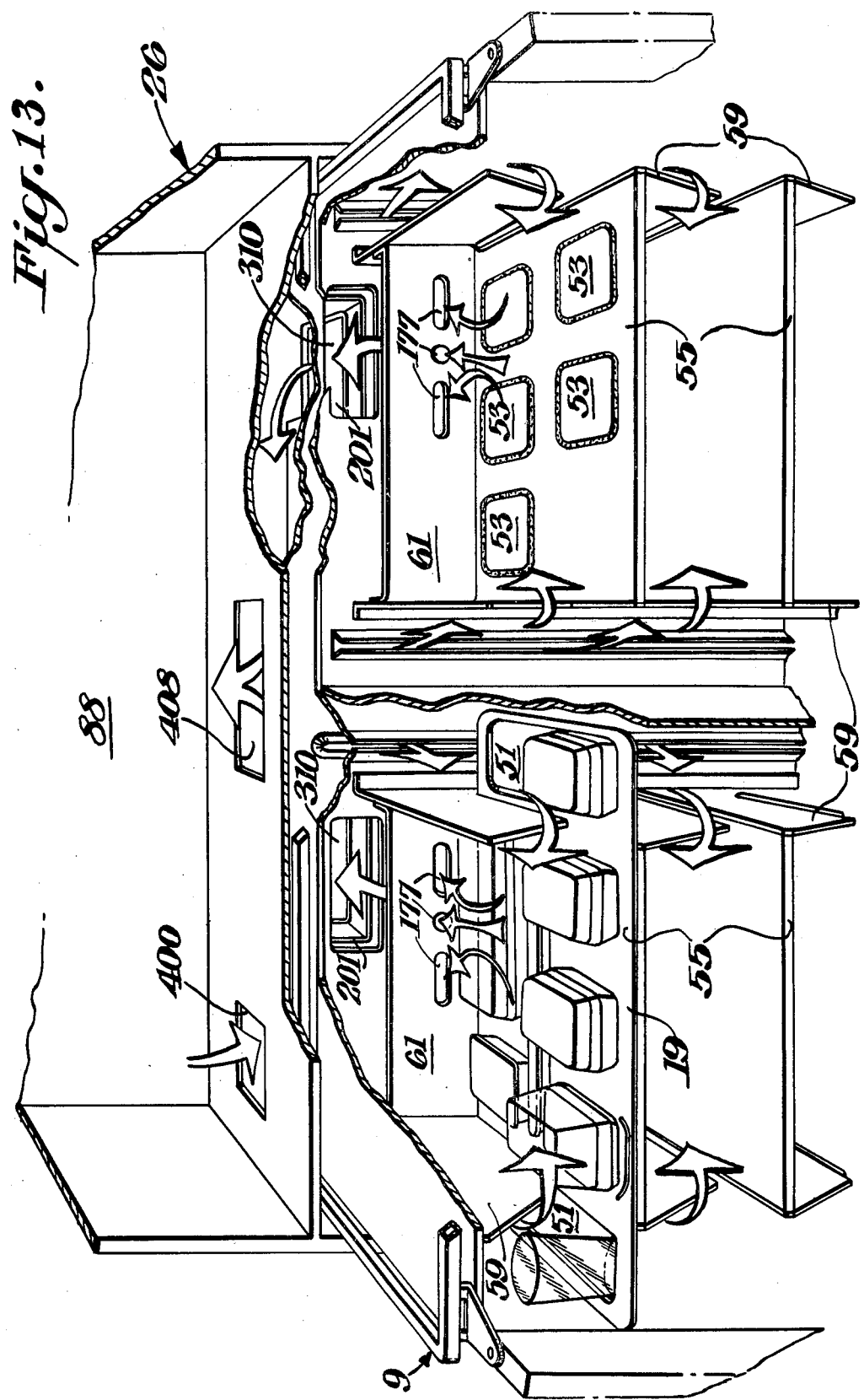
FIG. 13 is a schematic illustrating the refrigerated air loop circulation pattern through the environmental control unit and food beverage transport when in coupled position.

FIG. 1 is an exploded view of the system or assembly showing the main components of the assembly described in detail in parent application Ser. No. 758,455. In general the assembly includes two types of environmental control units (ECU), one used in the kitchen (KECU) or food preparation area for chilling the food and another (FECU) at the floor or location where the food is served. The food is arranged on trays 19 or 45 which are placed on heater shelves 55 secured to support 59 as later described on rack 61 in a food beverage transport (FBT) 9. The FBT with its food is coupled to the KECU to chill the food until a time proximate to the food being served. The FBT is then removed from the KECU and is coupled to the FECU 26 which selectively heats certain food items simultaneously with chilled air being circulated through the FBT 9. FIG. 1 illustrates transport module packs 7 which are initially held on FBT 9 by clips 6 and then inserted into transport command unit (TCU) 33 for controlling time/temperature heating of the selected food items by electrical connectors 71 when FBT 9 is coupled to FECU 26 by actuator 73. TCU 33 includes control panel 37 to permit changes in the program.

As shown in FIG. 1, FBT 9 includes a central partition 65 so that two racks 61 may be mounted therein. Similarly a pair of FBTs are inserted in each ECU. FBT 9 includes doors 80 (shown swung open) mounted by hinges 82, 84.

As also shown in FIG. 1 there are two types of trays which can be used with the assembly. The large general diet tray 19 accommodates full meals and the half size, modified diet tray 45 can be used for snacks, half meals and special diets. Both trays have holes or openings 47 which extend completely through the tray surface and support the dishes containing food to be heated such as the noninsulated entree dish 49 with its noninsulated cover or lid 49'. Dishes which fit in the other holes through the tray can be used for soup, cereal, bread, dessert, vegetables, fruit and the like. These dishes, with the exception of the entree dish, are interchangeable from hole to hole. Two smaller dishes can be used in place of the larger entree dish in the entree dish hole. In addition, the trays contain indents 51 in the tray surface which are used exclusively for supporting the dishes containing food to be served in chilled form. Chilled dishes may be placed in any opening 47 as long as the applicable heater elements is not programmed for heating.

When the trays 19 or 45 are supported by the heater shelf rack 61 in the FBT 9 they rest on heater shelves 55 whereby the raised heater elements 53 of the shelves 55 urge the dishes supported in the tray openings 47 out of contact with the tray since the element 53 extends above the general surface of the heating shelf 55. This eliminates any heat being transferred from the heated dishes supported by the raised heater elements 53 to the tray structure itself. Suitable wiring interconnects are supported within the heater shelf 55, the structure of which will be shown and described later (FIG. 7) and the wires gather at a terminal connector 195 of the heater shelf 55.

The heater shelves 55 are in turn supported on cantilever arm supports 59 on a heater shelf rack 61 which in turn fits within the partitions 63 of the FBT 9. Each FBT can accommodate two heater shelf racks in side by side relationship being divided by a central partition 65. As mentioned heretofore, the FBT 9 is moved upon its casters 67 into either the FECU 26 or the KECU with the rear wall of the FBT interfacing and coupling with the front wall 69 of the FECU 26 or KECU. The description following is primarily directed to the FECU 26. The electrical power source wires for the heater shelves 55 are gathered at connector 195 and are individually interconnected to a single connector 197 (FIG. 3) at the rear wall of the heater shelf rack 61 and this connector in turn mates with connector 71 located in the front wall of the FECU 26. The outlets 27 and the inlets 29 for circulating chilled air to the FBT 9 shown on the front wall of the FECU 26. A linear actuator 73 extending from the front wall of the FECU 26 connects with a mating socket on the back panel of the FBT 9 to automatically pull in the FBT 9 against the front wall of the FECU 26 to form a tight fit, to actuate the inlets 27 and outlets 29 and to connect the electricaL connectors of the heater shelf racks 61 with the sockets 71 in the front wall of the FECU 26. The FECU 26 is connected to the TCU 33 which when programmed by TMP 7 initiates and controls the heating and cooling cycles for the food and beverage within the FBT.

FIGS. 5-9 depict the heater shelf rack 61 and the manner in which it is installed in the FBT 9. FIG. 2 shows a side elevation of the heater shelf rack 61 while FIG. 3 shows a rear elevation of the heater shelf rack. As seen therein the rack 61 includes a series of vertically aligned cantilever supported heater shelf supports or arms 59 which support the heater shelves 55. As seen in FIG. 2, the cantilever arm supports 59 extend outwardly from the rear wall 175 of the rack 61 at each side thereof. Each opposing pair of arms carries a heater shelf 55. The rear wall of the heater shelf rack 61 includes vents 177 which are of greater area at the bottom of the rack but which gradually lessen in area as they extend from the bottom shelf upwardly to the top of the back panel 175. This design of the vents in the back panel 175 is important in that they provide equal flow of chilled air to be drawn off of each tray level thus eliminating stratification of the chilled air within the FBT 9. Each FBT 9 accommodates two of the heater shelf racks 61 in side-by-side relationship. The location or position of the rack 61 within the FBT 9 is assured by the alignment means. Vertical legs 179 extend along each side of the shelf rack 61. Alignment pins are anchored in the rear panel 183 of the FBT 9 (FIG. 9) and extend inwardly to the interior of the FBT. Alignment sockets 185 are supported by each leg 179 of the shelf rack which sockets slide over the alignment pins when the rack is installed. This insures exact positioning of the heater shelf rack 61 within the FBT 9. Not only are the heater shelf racks 61 aligned in position within the FBT 9 but they are also locked in place by means shown in FIGS. 2-3. In the rear panel of the FBT there are supported threaded barrels which align with each of the rails of the shelf rack. Affixed to and extending through the rails 179 are complimentary positioned threaded thumbscrews 189 which are screwed into the barrels to firmly lock the heater shelf rack 61 in position within the FBT 9.

The FBT 9 as well as the FECU 26 and the KECU are formed of panels consisting of pultruded fiberglass sections 190 which are filled with suitable insulating foam material 191 such as polyurethane to form insulated panels. These sections are formed by a pultruded process which is a commercial operation wherein the panels are pulled from the extrusion device rather than being extruded. After the sections 190 are formed they are foam filled with the foam material 191 to an approximately 2#/cu. ft. density, to provide proper insulative characteristics of the finished FBT and ECU.

Each heater shelf rack 61 includes a series of electrical ribbon cables 193 connected to a circuit board connector 195 which extends from heater shelf 55 (FIG. 2). As shown better in FIG. 3 the cables 193 extend upwardly from the bottom series of heater shelves 55 and downwardly from the upper shelves 55 to be gathered at an electrical connector housing 197 positioned in the back panel 175 of the heater shelf 61 and plugged into connectors 198 within the housing 197 which when the rack 61 is installed in FBT 9 is exposed to allow mating of connectors 198 with connectors 71 of the FECU 26 or KECU. The rear wall 183 of the FBT 9 has suitable openings 199 therein to permit access to the electrical connectors 198 within housing 197. Electrical connector 198 has a series of contacts 198' that engage with a series of sockets in connectors 71 of the FECU 26.

General diet trays 19 and modified diet trays 45 are shown in various positions in FIG. 2. More will be explained about the trays and how they mate with the heater shelf at a later point herein.

DESCRIPTION OF SERVING TRAYS

The general diet tray 19 is shown in FIGS. 11 and 6 while the modified diet tray 45 is depicted in FIG. 6. The general diet tray 19 as well as the modified diet tray 45 are formed preferably of a suitable plastic material such as polycarbonate and are light in weight. The tray 19 includes a slot 202 in which the menu for the particular meal being served can be inserted while the elongated indent 203 in the tray supports napkins and tableware. The tray indents 51 are used to support dishes containing food items which are to be served cold such as salads and desserts as well as glasses, cups, condiments, milk cartons, and the like. The dish supports 47 consist of holes or openings extending through the surface of the tray with a raised bead 204 extending around the periphery of the dish support 47 for supporting the dish as will be explained later. Of course, the tray openings 47 can also be used for dishes containing food to be served cold by not programming the heating cycle for the particular raised heated surface 53 underlying the tray opening 47 to be heated during the food preparation cycle.

The modified diet tray 45 shown in FIG. 6 has the similar dish indents 51 and dish openings 47 as with the FIG. 4 tray.

Tray 19 also has a raised bead 208 which extends around the tray periphery and in the leading edge side of the tray there are two notches 210 in the raised bead which serve as guides when inserting the tray in the heater shelf rack 61. These notches 210 are also shown in FIG. 5. The operation of these guiding notches will be explained further after the heater shelf 55 itself has been more fully described. The modified diet tray 45 also has notches 210 however here they exist in alignment in both the leading and trailing edge sides of the tray.

DESCRIPTION OF HEATER SHELF

FIGS. 7–10 illustrate the heater shelf 55 used with the present invention. As seen therein, there is provided a frame F, a lower panel 225, an upper panel 227 and a honeycombed layer 256 between the upper and lower panels. The lower panel 225 is formed of fiberglass, stainless steel, or the like. The upper heater panel 227 is formed of stainless steel and incorporates strategically spaced holes 260 for raised elements 53 which locate etched resistive film heaters 262 which are secured to raised elements 53 and the edge 261 of the spaced holes 260 of panel 227 by bonding with silicone rubber 263′. The film heaters supply heat to the raised heater elements 53. The film heaters 262 are wired electrically to the inward extension of printed circuit connector 195. The printed circuit board 195 is secured to the heater shelf frame F at the upper right hand corner as shown in FIG. 7.

As further shown in FIGS. 7–10, the heater shelf frame F has vertically extending edges 250 which extend upwardly and vertically extending edges 251 which extend downward. The upper surface of Frame F has a peripheral groove 252 and the lower surface of frame F has an inwardly extending peripheral flange 253. The upper heater shelf panel 227 fits over the heater shelf frame F and its skirted edges 254 extend downwardly to fit within the peripheral groove 252 of the heater shelf frame F and the edges 254 are bonded in place with a polysulphide adhesive 255. The lower heater shelf panel 225 fits within the heater shelf frame F and its skirted edges 257 are crimped as shown in FIG. 17 to fit within the opening 258 of the heater shelf frame F and come to rest upon peripheral flange 253. The edges 257 of lower panel 225 are bonded to the frame with a polysulphide adhesive 255. Sandwiched between the upper heater shelf panel 227 and the lower heater shelf panel 225 in those areas not occupied by the heater elements 262 is a honeycombed aluminum or nomex filler layer 256 as shown in the upper left-hand corner of FIG. 14. This gives structural strength to the heater shelf 55, providing lateral shear strength into both the upper shelf panel 227 and the lower heater shelf panel 225, when bonded into place using a polysulphide film adhesive 259.

Although the power wiring hookup is only shown with respect to the two film heater elements units 262 appearing at the top of FIG. 7, the same connection is used with the remaining three raised heater elements 53 shown in FIG. 7. The wiring as mentioned before for these raised heater elements travels through the wiring paths 233 cut or formed in the honeycomb structure 256.

The raised heater elements 53 are sheet stainless steel, of a thickness to remain rigid during the heating and cooling temperatures imposed on the heater shelves 55 when used in the FBT 9. The raised elements 53 are adhered by silicon adhesive 263 to the back side of the upper heater shelf panel 227 to cover the openings 260. The lower element of raised heater surface 53 has an etched resistive film heater 262 sandwiched between silicone pads 264 bonded in place.

As shown in the lower portion of FIG. 7, power is supplied to the film heater unit 262 by wire leads 265 which are secured to an edge of the silicone pad 264 on the bottom of the heater unit as at 266. The ends of the film leads are covered with a strip 267 of the same silicone material as used in pads 261 which covers the bottom of the heater unit 262.

TRAY GUIDE DESCRIPTION

The heater shelf frame F also includes tray guide ledges or upstanding side borders 275 at opposite sides of the panel shown in FIGS. 7 and 8. As shown in FIG. 8, side borders 275 taper upwardly at 516 from the leading edge thereof. The ledges include indents 277 and 279 located at the middle of the ledge and at the trailing edge of the ledge 275 respectively. As shown better in FIGS. 11 and 12 a short rib element 281 is located on the bottom surface of the tray 19 just inwardly of each elongated dish indent 51 of the tray and approximately at the middle point of the elongated indents 51. (Also see FIG. 4). FIG. 4 also shows the cutouts 210 in the leading edge of the tray 19. The attendant places the tray 19 on the heater shelf 55 with the cutouts 210 in the border of the tray 19 (also see FIG. 2). Immediately under the lower edge 514 of the cantilever heater shelf support 59 which is so spaced from the lower heater shelf 55 that the tray becomes positioned between the two so that the lower edge 514 of the cantilever support 59 will stay within the cutouts 210 of the tray along the leading edge of the tray thus forming a track for the tray as it is slid inwardly of the heater shelf 55. When the rib 281 reaches the middle indent 277 in the ledge guide 275 of the heater shelf it drops down into the indent thus positioning it in place and freeing the tray from the lower edge of the above positioned cantilever shelf support 59. This is shown in phantom in FIG. 12. The trailing edge of the tray 19 also has a downwardly extending rib 290 (FIG. 8) which drops into the indent 279 at the trailing edge thereof. The trays 19 can be withdrawn from their fully inserted position on the heater shelf 55 to a halfway inserted position with the rib 290 dropping into indent 277 of heater shelf 55 and the cutout 210 engaging the lower edge of the cantilever supported arms 59 whereby the tray 19 is anchored to prevent it from falling onto the floor. This arrangement permits one to pour beverages into the cups.

With the above arrangement the trays are insured of correct positioning with respect to the raised heater elements 53 when they are positioned or seated on the heater shelves 55 (see FIG. 2) as the trays straddle cantilevered supports 59 (FIG. 13).

The modified diet trays 45 operate in the same manner except that the ribs 281 extend vertically downwardly from the underside of each longitudinal or elongated side of the tray. Cutouts 210 as noted in FIG. 6 in the upper border of the elongated sides of the tray are found on both sides of the tray instead of just the leading edge side as with the general diet tray 19. As shown in FIG. 2 the cantilevered supports 59 include an upper edge 510, a depending side wall 512 and a lower horizontal edge 514. As previously noted, edges 514 are positioned to be above and in line with cutouts or notches 210 of the tray therebeneath. As shown in FIGS. 4–6 outermost indents or food receiving depressions 51 have rounded shoulders 518, 518 which are spaced from each other by a distance at least as great as the distance between support arms 59, 59 so that when the tray straddles the support arms rounded shoulders 518, 518 are disposed outside of and along the sides of its support arms 59, 59 as best shown in FIG. 13. As also shown in FIG. 2, each set of support arms 59, 59 is located above midway detents 277 a distance sufficiently small to inherently act as a stop and prevent the tray 19 or 45 therebelow from tipping upwardly (i.e. clockwise with respect for example to tray 19 on the fifth from the bottom set of support elements 59, 59) and falling off its heater shelf when its positioning rib is in midway detents 277. As shown in FIG. 5 positioning rib 290 extends across the tray and thus includes portions located below and in the same vertical plane as notches 210 for fitting in the heater shelf detents which are at the outer side edges of each heater shelf in the area of supports 59, 59. Similarly FIG. 5 illustrates shoulders 518 of food receiving depressions 51 to be outside of notches 210 and thus beyond support arms 59, 59 as apparent from the drawings.

CIRCULATION PATTERN FOR CHILLED AIR

FIG. 13 depicts the FBT 9 coupled to the FECU with the air inlets and outlets of both the FBT 9 and the FECU being the open position. Here the chilled air passes from chilled air unit 88 through outlets 400 and ultimately into the FBT 9 to travel along the sides of the heater shelf rack 61, forward to the front of the heater shelf rack arms 59 and, as better shown in FIG. 13, back over the trays 19 or 45, through vents 177 in the rear of the heater shelf rack and then out of the FBT 9 through the outlet ports 201 controlled by doors 310. From this point they are returned to the chilled air unit 88 through inlet 408 and then recycled into the FECU and FBT in the continuous loop pattern described above with the air being reconditioned by the air chilling apparatus in compartment 88 of the FECU 26.

As is clear from the drawings the chilled air is uniformly distributed over the heater shelves 55 and the trays 19 or 45 supported thereon to chill all the food items on the many trays in a uniform manner.

Because the dishes being heated and their covers or lids are noninsulated, loss of nutritional values of the food being heated is minimal. This is explained by the fact that the dishes being heated are simultaneously exposed to the continuous flow of chilled air which tends to cool the dish and cover surfaces and returns moisture lost in cooking back into the food product, and at the same time tempers the rate at which the food is cooked. The total effect is somewhat akin to low pressure steam cooking.

What is claimed is:

1. In combination a heater shelf rack and heater shelves and food serving trays, said rack including a plurality of sets of cantilevered support arms, each of said support arms including an upper edge and a depending side wall having a lower horizontal edge, each of said heater shelves being mounted to a corresponding set of said support arms, each of said heater shelves including a generally flat upper surface with at least one heater element thereon, each of said food serving trays including a generally flat upper surface, a raised border on at least the lead edge of each tray, a pair of notches in said raised border of said lead edge, said notches being spaced apart by the same distance as the distance between the lower horizontal edges of said support arms, each tray including at least one dish supporting opening for being disposed over said heater element, and each tray being supported by one of said heater shelves with the lower edges of the adjacent support arms above said heater shelf being disposed directly above said notches.

2. In combination a heater shelf rack and heater shelves and food serving trays, said rack including sets of support elements, each of said heater shelves being mounted to one of said sets of support elements, each heater shelf including a generally flat upper surface with at least one heater element thereon raised side borders on each heater shelf, each of said food serving trays including a generally flat upper surface, at least one dish supporting opening in each tray for being disposed over said heater element, each tray being supported on said side borders of its said heater shelf, each of said side borders having a first detent at its remote end thereof and a second detent about midway thereof, and a positioning rib on the lower surface of said tray for selectively fitting in said detents wherein each tray is disposed below a set of said support elements when said tray is mounted on its said heater shelf, said set of support elements above lack tray being located above and away from said midway detents by a distance sufficiently small to act as a stop and to prevent said tray therebelow from tipping upwardly and falling off its said heater shelf when said positioning rib of said tray is in said midway detents.

3. In combination a heater shelf rack and heater shelves and food serving trays, said rack including a plurality of sets of cantilevered support arms, each of said heater shelves being mounted to and between a corresponding set of said support arms, each of said heater shelves including a generally flat upper surface with at least one heater element thereon, each heater shelf having upstanding side borders, said borders tapering upwardly from the leading edge of said heater shelf, each of said food serving trays including a generally flat upper surface with at least one dish supporting opening for being disposed over said heater element, said tray having rounded shoulders in opposite corners of generally the lead end thereof disposed below said flat upper surface, said rounded shoulders being spaced from each other by a distance at least as great as the distance between the support arms of its set of support arms, and said tray straddling said support arms with said rounded shoulders disposed outside of and along side its said support arms.

4. In a combination a heater shelf rack and heater shelves and food serving trays, said rack including a plurality of sets of cantilevered support arms, each of said heater shelves being mounted to and between a corresponding set of said support arms, each of said heater shelves including a generally flat upper surface with at least one heater element thereon, each heater shelf having upstanding side borders supporting a respective food serving tray, each of said food serving trays including a generally flat upper surface with at least one dish supporting opening for being disposed over said heater element, said tray having a depression on opposite sides thereof spaced from each other by a distance at least as great as the distance between the support arms of its set of support arms and extending below said side borders of its heater shelf, and said tray straddling said support arms with said depressions disposed outside of and along side its said support arms.

5. The combination of claim 4 wherein said side borders taper upwardly from the leading edge of said heater shelf, and said depressions including rounded walls at its innermost corners at the lead edge of said tray.

6. The combination of claim 1 wherein said heater shelf includes raised side borders which support said tray, each of said side borders having a first detent at its remote end thereof and a second detent about midway thereof, and a positioning rib on the lower surface of said tray for selectively fitting in said detents.

7. The combination of claim 6 wherein each shelf supports a pair of said trays.

8. The combination of claim 7 wherein the trailing edge of each tray includes a raised side border having a pair of said notches therein.

9. The combination of claim 1 wherein the trailing edge of said tray includes a raised side border disposed in line with the cantilever support arms of the adjacent upper set.

10. The combination of claim 1 wherein each heater shelf includes upstanding side borders which support said tray, said side borders of said heater shelf tapering upwardly from its leading edge, said tray having rounded shoulders in opposite corners of generally the lead end thereof disposed below said flat upper surface, said rounded shoulders being spaced from each other by a distance at least as great as the distance between the support arms of its set of support arms, and said tray straddling said support arms with said rounded shoulders disposed outside of and along side its said support arms.

11. The combination of claim 1 wherein each heater shelf includes upstanding side borders which support said tray, said tray having a depression on opposite sides thereof spaced from each other by a distance at least as great as the distance between the support arms of its set of support arms and extending below said side borders of its heater shelf, and said tray straddling said support arms with said depressions disposed outside of and along side its said support arms.

12. The combination of claim 2 wherein said support elements are cantilevered support arms, each heater shelf includes upstanding side borders which support said tray, said side borders of said heater shelf tapering upwardly from its leading edge, said tray having rounded shoulders in opposite corners of generally the lead end thereof disposed below said flat upper surface, said rounded shoulders being spaced from each other by a distance at least as great as the distance between the support arms of its set of support arms, and said tray straddling said support arms with said rounded shoulders disposed outside of and along side its said support arms.

13. The combination of claim 2 wherein said support elements are cantilevered support arms, each heater shelf includes upstanding side borders which support said tray, said tray having a depression on opposite sides thereof spaced from each other by a distance at least as great as the distance between the support arms of its set of support arms and extending below said side borders of its heater shelf, and said tray straddling said support arms with said depressions disposed outside of and along side its said support arms.

14. The combination of claim 2 wherein each shelf supports a pair of said trays.

15. The combination of claim 14 wherein the trailing edge of each tray includes a raised side border having a pair of said notches therein.

16. The combination of claim 2 wherein the trailing edge of said tray includes a raised side border disposed in line with the cantilever support arms of the adjacent upper set.

17. The combination of claim 6 wherein said positioning rib includes portions located below and in the same vertical plane as said notches.

18. The combination of claim 6 wherein said tray includes rounded shoulders extending below said flat upper surface of said tray, and said shoulders being disposed outside of said notches whereby said shoulders are beyond said cantilevered support arms when said tray is on its heater shelf.

19. The combination of claim 18 wherein said tray includes a food receiving depression on each side thereof extending below said flat upper surface, and each of said shoulders comprising an outer edge of a respective one of said depressions.

20. The combination according to claim 2 wherein the heater elements are slightly raised above the surface of the heater shelf whereby when the tray is positioned on the heater shelf, the dishes supported in the tray openings will be moved out of contact with the tray.

21. The combination of claim 2 wherein the tray is halved in its widthwise dimension and two of said half size trays are supported on one heater shelf.

* * * * *

UNITED STATES PATENT OFFICE
CERTIFICATE OF CORRECTION

Patent No. 4,194,109     Dated March 18, 1980

Inventor(s) Donald A. Springer

It is certified that error appears in the above-identified patent and that said Letters Patent are hereby corrected as shown below:

Cover page, line "[73] Assignee: Messer Griesheim GmbH, Frankfurt am Main, Fed. Rep. of Germany" should read -- Anchor Hocking Corporation, Lancaster, Ohio --.

Column 2, line 5, "14." should read -- 7; --.

Column 2, line 63, "elements" should read -- element --.

Column 3, line 26, after "9", insert -- are --.

Column 3, line 31, "inlets" should read -- outlets --.

Column 3, line 32, "outlets" should read -- inlets --.

Column 3, line 32, "electricaL" should read -- electrical --.

Column 3, line 38, "5-9" should read -- 2-3 --.

Column 3, line 61, delete "(FIG. 9)".

Column 3, line 64, after "pins" insert -- 181 --.

Column 4, line 3, after "rack" insert -- 61 --.

Column 4, line 40, "11 and 6" should read -- 4 and 5 --.

Column 5, line 20, "263'" should read -- 263 --.

Column 5, line 40, "17" should read -- 10 --.

Column 5, line 48, "14" should read -- 7 --.

UNITED STATES PATENT OFFICE
CERTIFICATE OF CORRECTION

Patent No. 4,194,109   Dated March 18, 1980

Inventor(s) Donald A. Springer

It is certified that error appears in the above-identified patent and that said Letters Patent are hereby corrected as shown below:

Column 5, line 14 from the bottom, delete "elements".

Column 5, last line, "element" should read -- surface --.

Column 5, last line, "surface" should read -- element --.

Column 6, line 4, "unit" should read -- units --.

Column 6, line 6, "unit" should read -- element --.

Column 6, line 7, delete "film".

Column 7, line 30, delete ", as better shown in FIG. 13,".

Signed and Sealed this

Twelfth Day of August 1980

[SEAL]

Attest:

SIDNEY A. DIAMOND

Attesting Officer   Commissioner of Patents and Trademarks